United States Patent
Bhargava

(10) Patent No.: US 7,388,311 B2
(45) Date of Patent: Jun. 17, 2008

(54) REDUNDANT WINDINGS WITH CURRENT LIMITING MEANS FOR ELECTRIC MACHINES

(75) Inventor: Brij B. Bhargava, Santa Barbara, CA (US)

(73) Assignee: Ashman Technologies, Santa Barbara, CA (US)

( * ) Notice: Subject to any disclaimer, the term of this patent is extended or adjusted under 35 U.S.C. 154(b) by 85 days.

(21) Appl. No.: 11/227,805

(22) Filed: Sep. 14, 2005

(65) Prior Publication Data

US 2007/0057592 A1    Mar. 15, 2007

(51) Int. Cl.
*H02K 3/00* (2006.01)

(52) U.S. Cl. ........................ 310/184; 310/198
(58) Field of Classification Search ................ 310/184, 310/206, 198, 180, 203, 208, 205, 179, 49 R
See application file for complete search history.

(56) References Cited

U.S. PATENT DOCUMENTS

| | | | | | |
|---|---|---|---|---|---|
| 4,550,267 | A | * | 10/1985 | Vaidya | 310/184 |
| 4,774,428 | A | * | 9/1988 | Konecny | 310/198 |
| 4,792,709 | A | * | 12/1988 | Smith et al. | 310/49 R |
| 4,918,347 | A | * | 4/1990 | Takaba | 310/179 |
| 5,006,745 | A | * | 4/1991 | Nishio et al. | 310/177 |
| 5,675,196 | A | * | 10/1997 | Huang et al. | 310/67 R |
| 5,929,549 | A | * | 7/1999 | Trago et al. | 310/198 |
| 6,091,231 | A | * | 7/2000 | Prunty et al. | 322/46 |
| 6,313,560 | B1 | | 11/2001 | Dooley | |
| 6,864,667 | B2 | | 3/2005 | Buening et al. | |
| 6,936,948 | B2 | | 8/2005 | Bell et al. | |
| 2003/0218399 | A1 | * | 11/2003 | Iles-Klumpner | 310/156.53 |
| 2004/0041484 | A1 | * | 3/2004 | Horst et al. | 310/156.08 |
| 2004/0056558 | A1 | * | 3/2004 | Tagami et al. | 310/260 |
| 2004/0183392 | A1 | | 9/2004 | Dooley | |
| 2004/0184204 | A1 | | 9/2004 | Dooley | |
| 2004/0189108 | A1 | | 9/2004 | Dooley | |

* cited by examiner

*Primary Examiner*—Darrern Schuberg
*Assistant Examiner*—Alex W Mok
(74) *Attorney, Agent, or Firm*—Koppel, Patrick, Heybl & Dawson; Michael J. Ram

(57) ABSTRACT

An electric machine comprises a rotor assembly and a stator assembly adjacent the rotor assembly. The stator assembly includes windings disposed around a plurality of teeth, with each phase of the winding including at least one pair of coils wrapped in opposite directions around adjacent teeth to induce mutual inductance between the coils when electrical current flows through the phase of the winding. The coils of different phases are arranged to cancel magnetic coupling between the different phases. The winding arrangement provides a way to accomplish multiple, redundant, magnetically and electrically isolated windings with current limiting means in a single stator of an electric machine. The winding arrangements inherently provide an increase in mutual inductance and, therefore, an increase in impedance over that possible with prior art winding arrangements to limit the maximum short circuit current in the windings.

20 Claims, 6 Drawing Sheets

Phase A

Phase B

Phase C

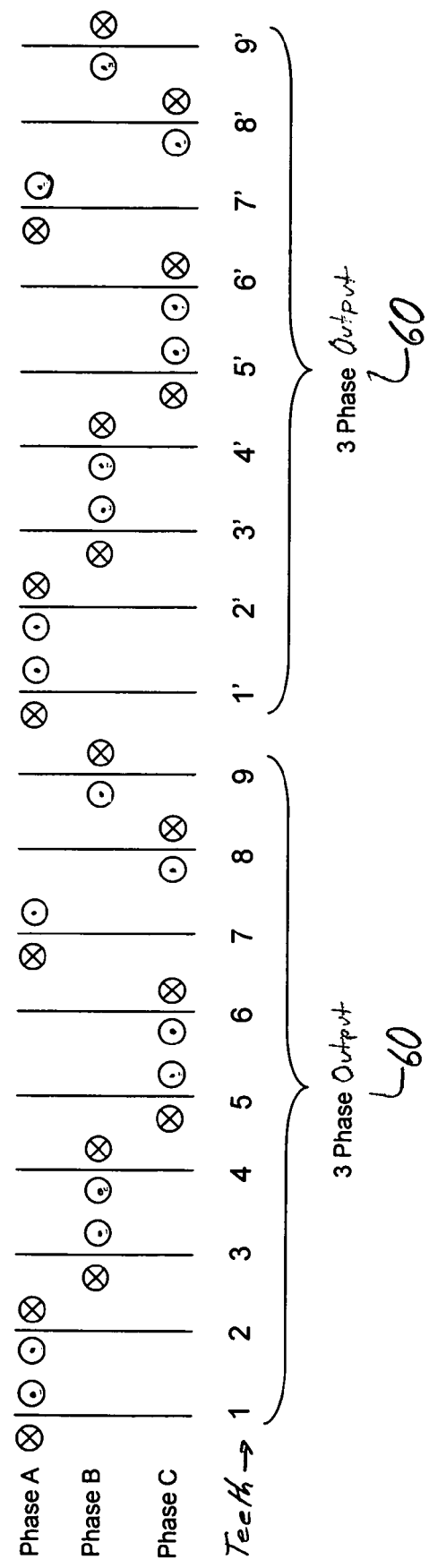

REDUNDANT WINDINGS WITH CURRENT LIMITING MEANS FOR ELECTRIC MACHINES

BACKGROUND

The present invention relates to electric machines such as, for example, motors, generators, alternators, starter-generators, and the like; and, more particularly, the present invention relates to electric machines having redundant windings with current limiting means.

One example of an electric machine is a permanent magnet electric motor or generator. This machine includes a rotor formed, at least in part, from a permanent magnet material such as samarium-cobalt. In a motor, current through the windings induces a rotating magnetic field, which in turn applies a torque to the magnetic portion of the rotor causing it to act as motor. Similarly, in a generator, torque applied to the rotor results in a rotating magnetic field that induces a current in the windings.

Such electric machines provide significant benefits over wound field synchronous machines, squirrel cage motors and other types of electric machines that require brushes. Significantly, permanent magnet machines do not require brushes, are relatively reliable and light, use electronics to generate any required rotating magnetic field, and can act as both a motor and a generator.

In view of these benefits, such machines appear well suited for aircraft applications. Particularly, such machines would appear to lend themselves for use as starters and generators within a turbine engine. Conveniently, such machines can be connected directly to the engine shaft. When required, generated electricity can be rectified and filtered using conventional lightweight electronics. When DC power is required, as in traditional aircraft applications, the speed of rotation and frequency of generator output do not need to be controlled. Such machines can function as both starters and generators.

Due to the heat generated by high short circuit currents in permanent magnet machines, the windings in permanent magnet machines must be sufficiently protected from the unlikely event of internal faults. Protective external circuits and equipment are often provided with fusible materials or electronic controls external to the windings of the electric machine; however, internal short circuit conditions may occur within the windings of a motor/generator that would not be detected or controlled by external fusing or controls. While various approaches have been developed to protect the windings from high short circuit currents, these approaches do not provide redundancy and safety features.

For example, one approach to providing protection within the windings is described in U.S. Pat. No. 6,313,560, which is incorporated by reference herein in its entirety. The '560 patent describes an electric machine including a magnetic component, forming part of its rotor or stator, that loses its magnetic characteristics above a certain chosen temperature. This magnetic material forms part of a magnetic circuit that guides flux about the stator. As a result, any magnetic flux emanating with the rotor stops circulating about the stator above this temperature, and the machine stops acting as a generator or a motor. The material forming the component is selected so that the chosen temperature is lower than the temperature at which the machine would be thermally damaged. This, in turn, limits the operating temperature of the windings, and thus prevents overheating of the machine during operation typically caused by a fault. Problematically, once the temperature is exceeded, the machine stops working until the machine cools down. Thus, there is a period where the machine provides no power.

Another approach is described in US Patent Application Publication No. 2004/0189108, which is incorporated by reference herein in its entirety. This publication describes a permanent magnet electric machine wherein the material of the stator is selected such that magnetic flux circulation through the stator is impeded when the stator material acquires a temperature above its Curie temperature. Like the aforementioned '560 patent, once the temperature is exceeded, the machine stops working until the machine cools down.

Yet another approach is described in US Patent Application Publication No. 2004/0183392 and US Patent Application Publication No. 2004/0184204, both of which are incorporated by reference herein in their entirety. These publications describe various means for limiting maximum current conducted through windings of an electric machine having a rotor and a stator. By encouraging an appropriate leakage flux around a winding, a leak impedance can be achieved which may be used to limit the maximum current in the winding as a matter of machine design. The means described in these publications, like slot geometry including extremely small slot gap width, large radial tooth top height, and use of top sticks made of material having high magnetic permeability, have been extensively used for over 20 years in various engine-dedicated types of permanent magnet alternators used on turbine engines to effectively increase the inductance. Problematically, such means do not provide for winding redundancy. That is, if one phase of the windings is shorted, the remaining phases do not continue to provide the same electrical output as before.

In summary, there remains a need for a method and apparatus for limiting short circuit current in electric machines that will allow the machine to continue to work, at least at reduced capacity, during and after the short circuit condition. Furthermore, there remains a need for a method and apparatus for limiting short circuit current in electric machines that will provide magnetic and electrical isolation of the windings, thereby providing winding redundancy and reliability under fault conditions. Prior art methods do not fulfill these needs.

SUMMARY

In one aspect, there is provided an electric machine comprising a rotor assembly and a stator assembly adjacent the rotor assembly. The stator assembly includes windings disposed around a plurality of teeth, wherein each phase of the windings includes at least one pair of coils wrapped in opposite directions around adjacent teeth to induce mutual inductance between the coils. The coils of different phases may be magnetically and electrically isolated to provide winding redundancy.

A total impedance of the phase may be sufficiently high such that a short circuit current in the phase of the windings is limited to a current magnitude below that at which thermal damage is caused to the electric machine. The total impedance may also be sufficiently high such that current in the phase of the winding is limited to a predetermined current magnitude.

In another aspect, an electric machine comprises a rotor assembly and a stator assembly adjacent the rotor assembly. The stator assembly has windings disposed in a plurality of slots. Each phase of the windings includes at least one pair of coils disposed in the same slot and arranged such that, during operation, electrical current in the pair of coils flows in the same direction through the slot for increasing mutual inductance between the coils.

In yet another aspect, a method for limiting short circuit current in an electric machine is presented. The electric machine includes a stator assembly having windings disposed on a plurality of teeth. The method comprises: disposing two coils of a phase of the windings onto adjacent teeth of the stator, the adjacent teeth being separated by a slot; and arranging the two coils such that, in a fault condition, a short circuit current flows through each of the coils in the same direction through the slot to induce mutual inductance between the coils, the mutual inductance providing part of a total impedance of the phase, the total impedance being sufficiently high to limit a magnitude of the short circuit current to below that which will cause thermal damage to the electric machine

BRIEF DESCRIPTION OF THE DRAWING

Referring now to the Drawing wherein like items are numbered alike in the various Figures:

FIG. 7 is a schematic representation of a winding arrangement in accordance with another alternative embodiment of the present invention.

DETAILED DESCRIPTION

Figure 1:
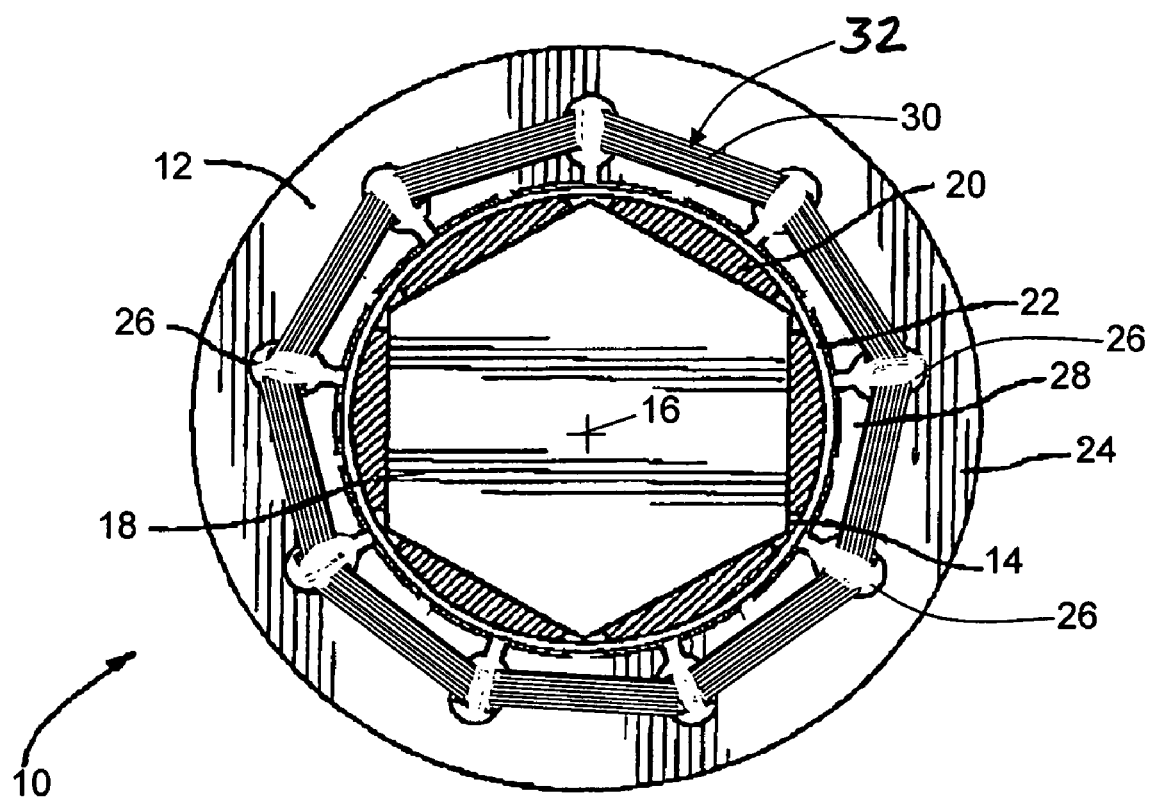
FIG. 1 is a schematic end view of a rotor and a stator of an electrical machine that may be used with the winding arrangement of the present invention.
Figure 2:
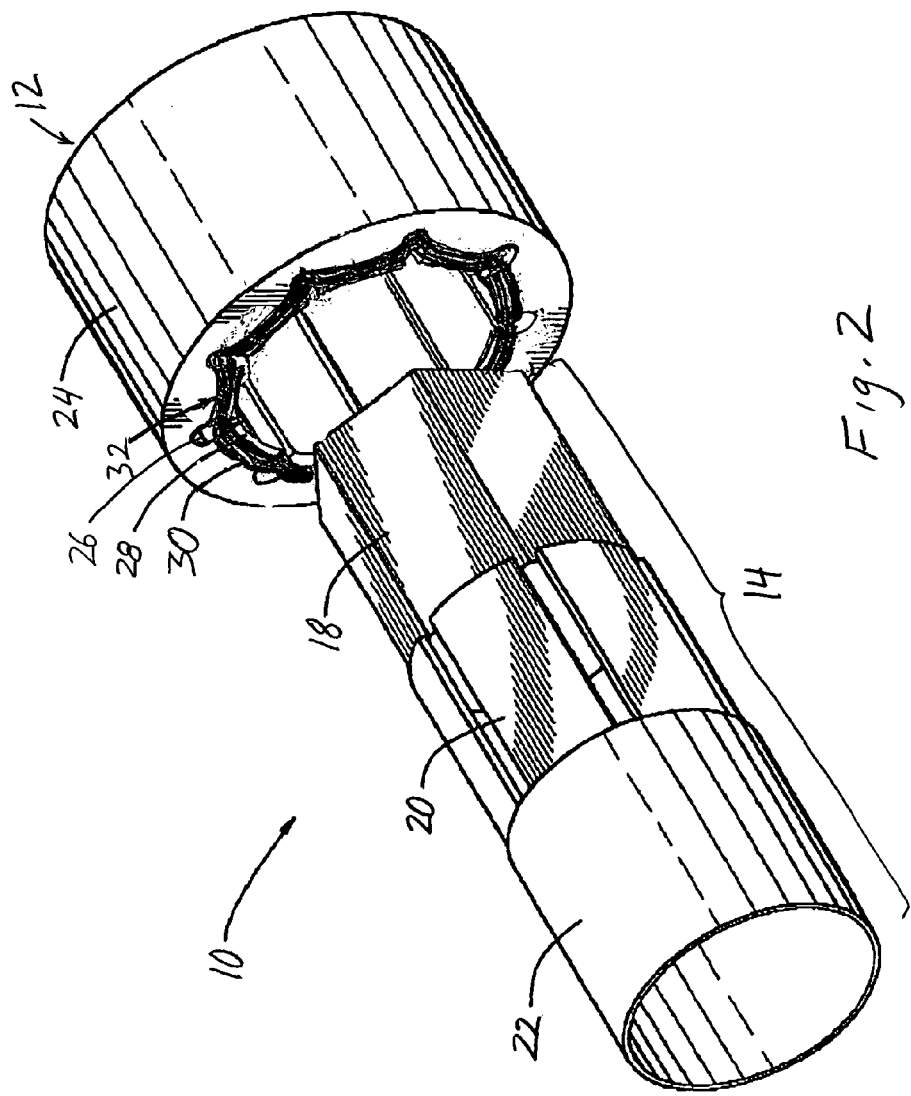
FIG. 2 is a schematic, partially exploded perspective view of the rotor and stator of the machine of FIG. 1.

Referring to FIGS. 1 and 2, an example of an electric machine (machine) that may be used with the winding arrangement of the present invention is shown generally at 10. In the example of FIG. 1, the electric machine is depicted as a typical permanent magnet motor/generator. It is contemplated, however, that the present invention may be embodied in any electric machine having a stator with windings, including motors, generators, alternators, starter-generators, and the like, employing permanent magnets or otherwise.

In the example shown, electric machine 10 includes a stator assembly 12 and rotor assembly 14. Rotor assembly 14 is mounted such that it freely rotates about its central axis 16 concentric to the stator assembly 12. Rotor assembly 14 includes a rotatable shaft 18 having permanent magnets 20 secured about its perimeter by a retaining ring 22 or by other suitable means. Each of the permanent magnets 20 forms a magnetic pole of the machine 10. While the machine 10 is shown as having six poles, it will be appreciated that the number of poles may be selected as required for a particular application.

Stator assembly 12 includes a stator core 24, which may be made of low-loss magnetic material (e.g., silicon steel, electrical steel laminates, powdered iron material, and the like). The stator core 24 has a plurality of lengthwise extending, evenly spaced slots 26 extending on its interior. The slots 26 define sides of a plurality of teeth 28, each of which is formed by the portion of the stator core 24 extending between the slots 26. In the example shown, a total of nine slots 26 and teeth 28 extend along the stator core's length. It will be appreciated, however, that the number of slots 26 and teeth 28 may be selected as required for a particular application. Also, it will be appreciated that the slots 26, teeth 28, and various other features of the machine 10 are not drawn to scale or proportion, and are shown for ease of description of the concepts presented.

Disposed within the slots 26 and wrapped around the teeth 28 are conductors 30, which form windings 32 of the stator assembly 12. The arrangement of the windings 32 will be described in further detail hereinafter. Also disposed within the slots 26 may be slot insulation, varnish coatings, conductor insulation, and any other material typically used in the manufacture of the stator assembly 12.

In the embodiment shown, the conductors 30 are depicted as insulated, electrically conductive wires, and the windings 32 are depicted as being formed from the wires being wrapped multiple times around each tooth 28. It is contemplated, however, that the conductors 30 forming the windings 32 may be any suitable insulated, electrically conductive structure that may be wrapped, pre-shaped, or otherwise assembled to form one or more turns around the teeth 28. For example, the conductors 30 may include insulated, electrically conductive bars, rods, or the like, which are shaped or assembled to form one or more turns around the teeth 28.

As used herein, the term "slot" is the portion of the stator receiving the conductor(s) 30. A slot, therefore, may be a recess having one open side along its length, as depicted in FIGS. 1 and 2, or may be some other recess within the stator capable of receiving the conductor(s) 30. The shape and size of the slot may be selected as needed for a particular application. Similarly, the term "tooth" is used herein as the portion of the stator around which the conductor(s) 30 are disposed. A tooth, therefore, may be a structure having its sides defined by the slots 26 and one free end proximate the rotor 14, or may be some other structure formed as part of, or attached to, the stator 12. The shape and size of the tooth may be selected as needed for a particular application.

As is well understood, electric machine 10 may operate in a generator (alternator) mode or in a motor (starter) mode. When operated in a generator (alternator) mode, an external torque source (e.g., a turbine engine) forces rotation of the shaft 18 about its axis 16, and causes the magnets 20 to pass the windings 32, causing a magnetic flux to loop the windings 32 in the slots 26. As the rotor assembly 14 rotates, the magnetic flux in the stator assembly 12 changes, and this changing flux results in generation of voltage in the windings 32, which results in electrical output.

When operated in a motor (starter) mode, a voltage from an external source is applied to the windings 32 which causes current flow in the windings 32 and results in a magnetic flux to be set up in the magnetic circuit formed by the teeth 28 and stator core 24. When current is supplied in an appropriate manner to the windings 32, the rotor assembly 14 can be made to rotate and thus produce usable torque.

Figure 3:
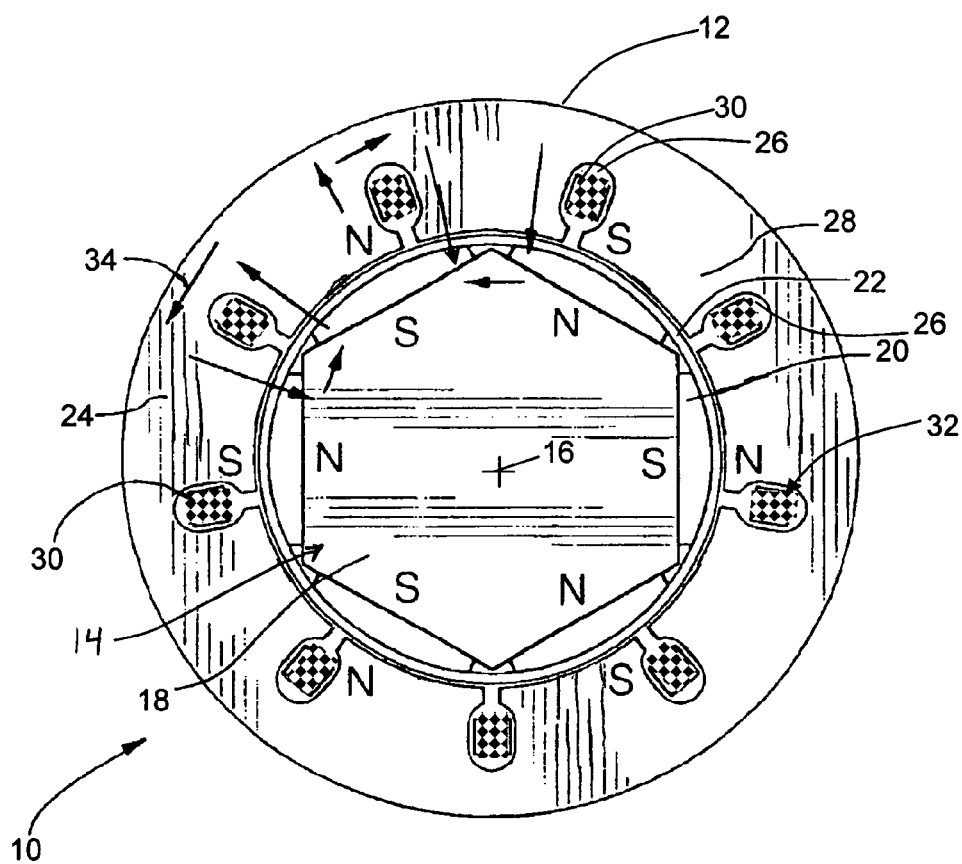
FIG. 3 is a schematic end view depicting a flux path in the electrical machine of FIG. 1.

Irrespective of whether operated in an alternator or motor mode, the magnetic flux path in the electric machine 10 is as partially and simply depicted in FIG. 3, the flux path as indicated by the arrows 34, and the poles and virtual poles denoted by an "N" or an "S". It is this magnetic flux 34 which induces a voltage in the alternator winding 32 (or in the case of a motor, creates the magnetic attraction with the permanent magnet 20 to cause rotor 14 rotation), as described above.

In the example of FIGS. 1-3, the electric machine 10 is depicted as a typical permanent magnet motor/generator having its rotor assembly 14 disposed within the stator assembly 12 (an "inside rotor" configuration). It is also contemplated that the electric machine 10 can have an "outside rotor" configuration, where the stator assembly 12 is disposed within a hollow, cylindrical rotor assembly 14, which is arranged to rotate about the stator assembly 12. In this "outside rotor" configuration, the slots 26 and teeth 28 would be formed on the outer perimeter of the stator 12, and the permanent magnet 20 would be attached to the inside surface of the rotor 14.

Figure 4A:
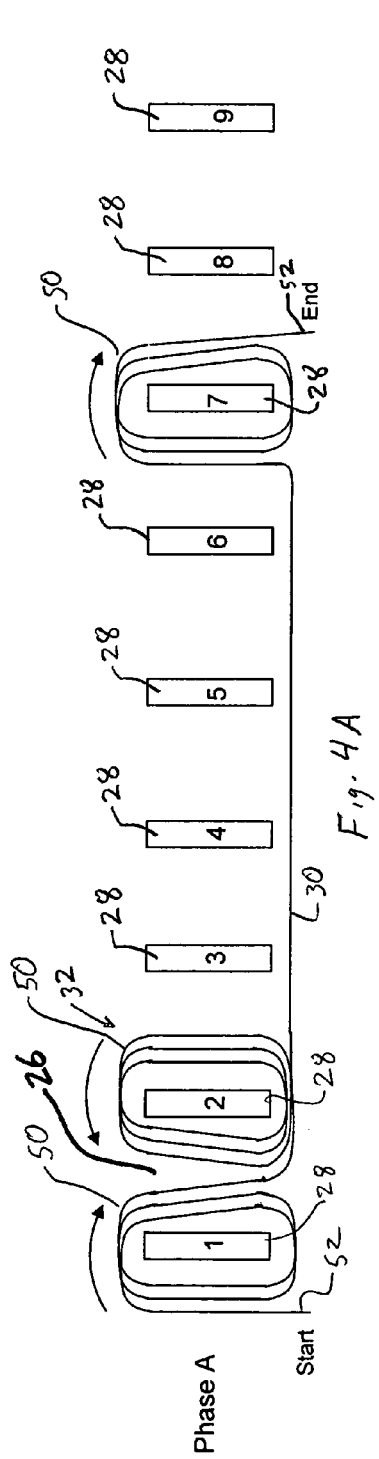
FIGS. 4A-4C depict a method of winding a portion of the stator of FIG. 1 for limiting current through the windings in accordance with an embodiment of the present invention.
Figure 4B:
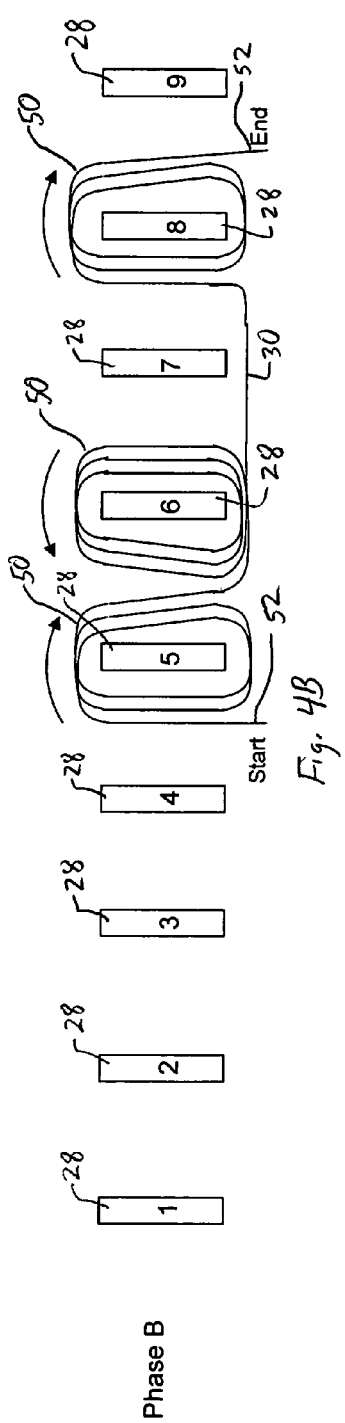
Figure 4C:
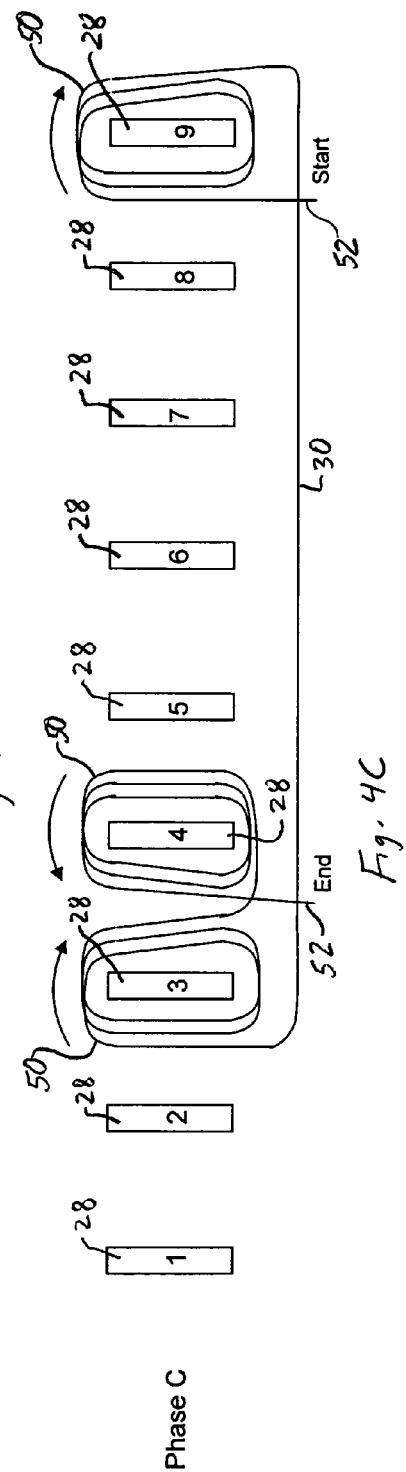

FIGS. 4A-C depict an arrangement of the windings 32 of the stator 12 of FIG. 1 for limiting current through the windings 32. As previously noted, while only nine teeth 28 are shown, as numbered 1 through 9, the number of teeth 28 may be selected as required for a particular application. In FIGS. 4A-C, the winding arrangement for each phase A, B, and C of a three-phase electric machine are shown, respectively. Each phase has three coils 50 connected in series. As used herein, a "coil" is a portion of a phase disposed around a single tooth. A coil may include, for example, insulated conductors 30 wrapped around a tooth 28 one or more times, as depicted in FIGS. 4A-C, or a coil may include insulated, electrically conductive bars, rods, or the like, which are shaped or assembled to form one or more turns around a tooth 28.

The ends of the conductors 30 form six leads 52, which may be arranged such that they can be treated as three identical, 120 electrical degrees apart, single phase outputs. Alternatively, the leads 52 can be connected to provide one three phase output.

In the embodiment shown, the first coil 50 belonging to phase A is wound clockwise on the first tooth 28, the second coil 50 is wound counter clockwise on the second tooth 28 and the third coil 50 is wound clockwise on the seventh tooth 28. Similarly, the first coil 50 belonging to phase B is wound clockwise on the fifth tooth 28, the second coil 50 of phase B is wound counter-clockwise on the sixth tooth 28, and the third coil 50 of phase B is wound clockwise on the eighth tooth 28. The coils 50 belonging to phase C are wound clockwise on the ninth tooth 28, clockwise on the third tooth 28, and counter-clockwise on the fourth tooth 28.

While each coil 50 is depicted as including three turns of the conductor 30 around each tooth 28, it is contemplated that the number of turns of the conductor 30 may be one or more turns, as required for a particular application. Furthermore, the winding arrangement depicted in FIGS. 4A-C is for a six pole machine. It is contemplated that the present invention may be employed in machines having a different number of poles.

Figure 5:
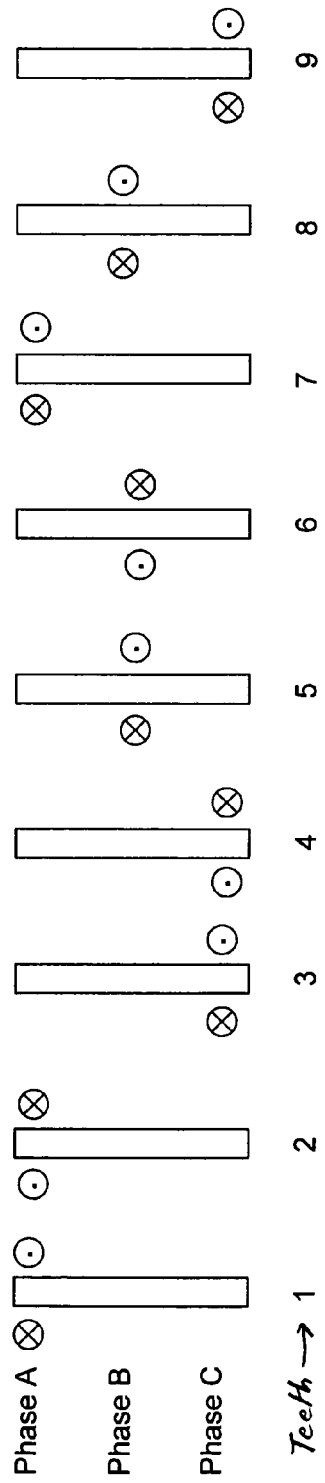
FIG. 5 is a schematic representation of the winding arrangement of FIGS. 4A-C.

FIG. 5 is a schematic representation of the winding arrangement of FIGS. 4A-C. In FIG. 5, the symbols ⊗ and ○ disposed on opposite sides of each tooth represent the direction that the coil is wrapped around that tooth. For example, ○|⊗ indicates that the coil is wrapped counter-clockwise around the tooth, and ⊗|○ indicates that the coil is wrapped clockwise around the tooth.

Figure 6:
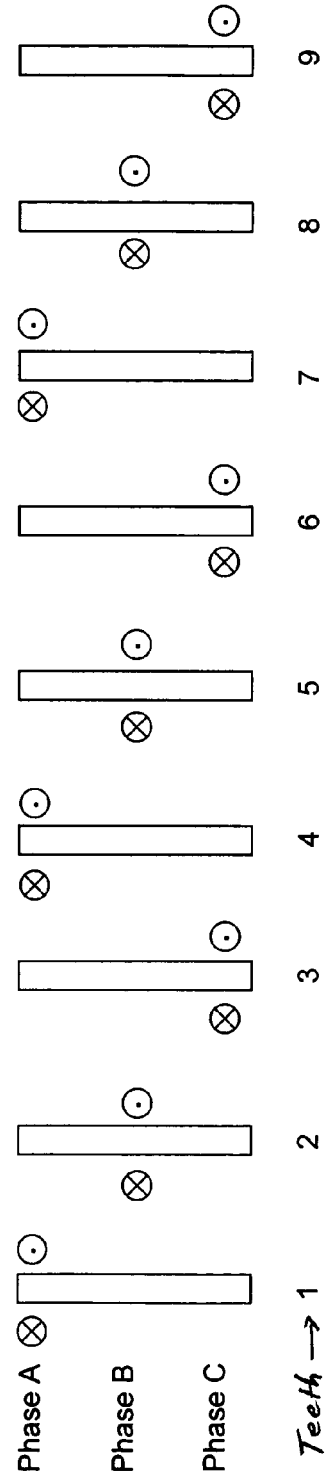
FIG. 6 is a schematic representation of a prior art winding arrangement.

FIG. 6 is a schematic representation of a prior art winding arrangement, which is provided for comparison. As can be seen in FIG. 6, the coils belonging to phase A are all wound clockwise (or all counter-clockwise) around the first, fourth, and seventh teeth; the coils belonging to phase B are all wound clockwise (or all counter-clockwise) around the second, fifth, and eighth teeth; and the coils belonging to phase C are all wound clockwise (or all counter-clockwise) around the third, sixth, and ninth teeth.

As can be seen from FIGS. 4A-C and 5, the location of the coils 50 in the stator slots 26 (FIG. 1) belonging to the same phase is such that it increases inductance in that phase over that possible with the conventional winding arrangement depicted in FIG. 6. For example, in the embodiment of FIGS. 4A-C and 5, the first coil 50 belonging to phase A is wound clockwise on the first tooth 28 and the second coil 50 is wound counter-clockwise on the second tooth 28. As electric current passes through these coils 50, current in the adjacent pair of coils 50 flows in the same direction through the same slot 26 (e.g., the slot 26 between the first and second teeth), which increases mutual inductance between the coils 50 to greater than that possible with prior art winding configurations, such as that shown in FIG. 6. The increase in mutual inductance results in an increase in total impedance in that phase (total phase impedance). The inventor has recognized that the increase in total phase impedance can be used advantageously to limit the maximum possible current flowing through the winding, thus providing the machine designer with a tool to provide intrinsic current limiting and short circuit protection.

The additional mutual inductance between the adjacent coils 50 of the same phase permits the designer to achieve a total phase impedance necessary to limit the current appropriately in the machine 10. The total phase impedance can be accurately defined and controlled, for example, by selecting the number of turns and location of the coils 50, and/or by selecting various features of the stator core 24, including the size, shape, and material of the stator core 24 (e.g., the slots 26 and teeth 28) and the size of the air gap between the stator core 24 and the rotor 14. It will be appreciated that the rotor and stator can be of a different design and construction from that shown in FIGS. 1-3. For example, the machine 10 may be an axial air gap machine.

Preferably, a total phase impedance is defined for a given design such that the maximum short circuit current is low enough to negate the possibility of thermal damage to the machine 10 (i.e., the maximum temperature rise of the shorted phase of the windings is less than the temperature limit of the machine insulation and other materials used in the machine, and is less than the temperature that would cause catastrophic damage to the non-shorted windings of the machine) in the event of a short circuit. In any event, the net result of this aspect of the present invention is to limit the short circuit current in the windings 32.

As also can be seen from FIGS. 4A-C and 5, the winding configuration ensures that mutual coupling between different phases is eliminated, thereby providing magnetic isolation. For example, the first and second coils 50 belonging to phase A (teeth 1 and 2) are adjacent to the first and third coils 50 of phase C (teeth 3 and 9), respectively. The first coil 50 of phase A is wound in the same direction as the adjacent, third coil 50 of phase C, while the second coil 50 of phase A is wound in a different direction than the adjacent, third coil 50 of phase C. As electric current passes through these coils 50, this arrangement cancels any magnetic coupling between the phases.

Because the phases are electrically isolated (by way of electrical insulation between the phases) and magnetically isolated (by way of the winding arrangement), loss of any one of the phases will not affect other phases, which will continue to provide the same electrical output as before the loss. In other words, the arrangement shown in FIGS. 4A-C and 5 provides winding redundancy. This is unlike conventional machines wherein a short in one phase will affect the other phases because of the magnetic coupling between phases.

FIG. 7 depicts the winding arrangement of FIG. 5 implemented in an eighteen tooth stator, 12 pole rotor combination.

In the embodiment of FIG. 7, the pattern depicted in FIG. 5 for teeth 1-9 is repeated for teeth 1'-9'. The conductors on teeth 1-9 and 1'-9' may be arranged to form two, three-phase electrical outputs 60.

Advantageously, the arrangement of FIG. 7 provides an additional level of redundancy. As previously noted, the electrical and magnetic isolation of each phase allows the loss of any one of the phases without affecting the other phases, which will continue to provide the same electrical output as before the loss. In addition, with the arrangement depicted in FIG. 7, each of the three-phase electrical outputs 60 are electrically and magnetically isolated. As a result, the three-phase electrical outputs 60 are redundant. If any one of the three-phase electrical outputs 60 fails, the remaining three-phase electrical output 60 can still function as before the failure.

The winding arrangements of the present invention provide a way to accomplish multiple, redundant windings with current limiting means in a single stator of an electric machine. The winding arrangements inherently provide a higher mutual inductance and, therefore, a higher impedance to limit the maximum current in the windings. The present invention permits the designer of a rotating electric machine to ensure that the maximum short circuit current in the winding does not cause current high enough to damage the insulation of the windings or cause other critical damage. However, in the event of an internal fault, the machine will provide reduced output.

It should be understood that any of the features, characteristics, alternatives or modifications described regarding a particular embodiment herein may also be applied, used, or incorporated with any other embodiment described herein. The figures are not drawn to any scale and show only the radial air gap type of machine. Various other types of rotor and stator constructions may be used. For example, the invention may be employed in axial air gap types of machines, and/or the rotor design may use permanent magnets in conjunction with steel poles mounted on a non-magnetic material hub and secured by a retaining ring.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An electric machine that provides winding redundancy via magnetically isolated phases and limits short circuit current in any of said phases, the machine comprising:
   a stator that defines a plurality of teeth;
   permanent magnets;
   a rotor that carries said magnets and is arranged for rotation relative to said stator; and
   conductors arranged as windings that define coils about said teeth wherein said windings are configured to define said phases which each include respective ones of said coils and which can be considered in phase pairs wherein the coils of said phases are interleaved so that:
   a) each of said phases includes at least one pair of said coils that are wrapped in opposite directions about adjacent ones of said teeth;
   b) each of said phase pairs include a coil from one of said phase pair and a coil from the other of said phase pair that are wrapped in opposite directions about adjacent ones of said teeth; and
   c) each of said phase pairs include a coil from one of said phase pair and a coil from the other of said phase pair that are wrapped in the same direction about adjacent ones of said teeth.

2. The electric machine of claim 1, wherein the number of phases is three.

3. The electric machine of claim 1, wherein at least one coil of each of said phases is separated from other coils of that phase by at least one of said teeth.

4. The electric machine of claim 1, wherein there are six poles created by said magnets and nine of said stator teeth.

5. The electric machine of claim 1, wherein there are twelve poles created by said magnets and eighteen of said stator teeth.

6. The electric machine of claim 1, wherein there are N poles created by said magnets and 1.5N of said stator teeth.

7. The electric machine of claim 1, wherein said rotor is disposed within said stator.

8. The electric machine of claim 1, wherein the total inductance of each of said phases is sufficiently high such that a short circuit current in each of said phases is limited to a current magnitude below that at which thermal damage is caused.

9. The electric machine of claim 1, wherein the total inductance of each of said phases is sufficiently high such that current in each of said phases is limited to a predetermined current magnitude.

10. The electric machine of claim 1, wherein each of said phases are magnetically and electrically isolated from others of said phases to thereby provide redundancy of said windings.

11. The electric machine of claim 1, wherein said windings include at least two redundant electrical outputs.

12. An electric machine that provides winding redundancy via magnetically isolated phases and limits short circuit current in any of said phases, the machine comprising:
    N pole permanent magnet rotor assembly;
    a stator that defines 1.5N teeth;
    a rotor that carries said assembly and is arranged for rotation relative to said stator; and
    electrically-conductive wires arranged as windings that define coils about said teeth wherein said windings are configured to define said phases which each include respective ones of said coils and which can be considered in phase pairs wherein at least one coil of each of said phases is separated from other coils of that phase by at least one of said teeth so that:
    a) each of said phases includes at least one pair of said coils that are wrapped in opposite directions about adjacent ones of said teeth;
    b) each of said phase pairs include a coil from one of said phase pair and a coil from the other of said phase pair that are wrapped in opposite directions about adjacent ones of said teeth; and
    c) each of said phase pairs include a coil from one of said phase pair and a coil from the other of said phase pair that are wrapped in the same direction about adjacent ones of said teeth.

13. The electric machine of claim 12, wherein the number of said phases is three.

14. The electric machine of claim 12, wherein said rotor is disposed within said stator.

15. The electric machine of claim 12, wherein at least one coil of each of said phases is separated from other coils of that phase by at least one of said teeth.

16. A method of configuring an electric machine to provide winding redundancy via magnetically isolated phases and to limit short circuit current in any of said phases, the method comprising the steps of:

defining a plurality of teeth on a stator;

arranging a rotor for rotation relative to said stator;

arranging conductors as windings that define coils about said teeth wherein said windings are configured to define said phases which each include respective ones of said coils and which can be considered as phase pairs; and interleaving the coils of said phases so that:
a) each of said phases includes at least one pair of said coils that are wrapped in opposite directions about adjacent ones of said teeth;
b) each of said phase pairs include a coil from one of said phase pair and a coil from the other of said phase pair that are wrapped in opposite directions about adjacent ones of said teeth; and
c) each of said phase pairs include a coil from one of said phase pair and a coil from the other of said phase pair that are wrapped in the same direction about adjacent ones of said teeth.

17. The method of claim 16, wherein the number of said phases is three.

18. The method of claim 16, further including the step of separating at least one coil of each of said phases from other coils of that phase by at least one of said teeth.

19. The method of claim 16, further including the step of disposing said rotor within said stator.

20. The method of claim 16, wherein there are N rotor poles and 1.5N of said stator teeth.

* * * * *